(12) United States Patent
McCallum

(10) Patent No.: US 10,050,789 B2
(45) Date of Patent: Aug. 14, 2018

(54) KERBEROS PREAUTHENTICATION WITH J-PAKE

(71) Applicant: Red Hat, Inc., Raleigh, NC (US)

(72) Inventor: Nathaniel McCallum, Nicholasville, KY (US)

(73) Assignee: Red Hat, Inc., Raleigh, NC (US)

( * ) Notice: Subject to any disclaimer, the term of this patent is extended or adjusted under 35 U.S.C. 154(b) by 255 days.

(21) Appl. No.: 14/950,701

(22) Filed: Nov. 24, 2015

(65) Prior Publication Data

US 2016/0315772 A1    Oct. 27, 2016

Related U.S. Application Data

(60) Provisional application No. 62/152,207, filed on Apr. 24, 2015.

(51) Int. Cl.
*H04L 9/32* (2006.01)
*H04L 9/08* (2006.01)
*H04L 9/30* (2006.01)

(52) U.S. Cl.
CPC .......... *H04L 9/3213* (2013.01); *H04L 9/0844* (2013.01); *H04L 9/3033* (2013.01); *H04L 9/3242* (2013.01)

(58) Field of Classification Search
CPC .................................................. H04L 9/3213
USPC ........................................................ 713/155
See application file for complete search history.

(56) References Cited

U.S. PATENT DOCUMENTS

| | | | |
|---|---|---|---|
| 5,778,065 A * | 7/1998 | Hauser | H04L 9/0891 380/279 |
| 6,169,802 B1 * | 1/2001 | Lerner | H04L 9/0891 380/44 |
| 7,451,312 B2 | 11/2008 | Medvinsky et al. | |
| 7,565,537 B2 | 7/2009 | Morais et al. | |
| 7,757,275 B2 | 7/2010 | Crall et al. | |
| 7,818,562 B2 | 10/2010 | Rich et al. | |

(Continued)

OTHER PUBLICATIONS

Hao, Feng and Ryan, Peter, "J-PAKE: Authenticated Key Exchange Without PKI", Thales E-Security, Cambridge, UK; Faculty of Science, University of Lusembourg, 24 pages https://eprint.iacr.org/2010/190.pdf (Last accessed Jan. 7, 2016).

(Continued)

*Primary Examiner* — Hadi S Armouche
*Assistant Examiner* — Khalil Naghdali
(74) *Attorney, Agent, or Firm* — Lowenstein Sandler LLP

(57) ABSTRACT

A method relates to receiving, by an authentication server, an authentication request from a client device via a public network, selecting a first private key of the authentication server from a first range of numbers and a second private key of the authentication server from a second range of numbers, receiving, from the client device, a first public key of the client device and a second public key of the client device, calculating a third private key of the authentication server in view of the second private key of the authentication server and a numerical value of the password, receiving a third public key of the client device, calculating a session key of the authentication server in view of the second public key of the client device, the third public key of the client device, and the third private key of the authentication server, and validating the session key.

18 Claims, 5 Drawing Sheets

(56) References Cited

U.S. PATENT DOCUMENTS

| | | | |
|---|---|---|---|
| 8,443,194 B2 | 5/2013 | Liu et al. | |
| 8,468,353 B2 | 6/2013 | Wei et al. | |
| 8,776,176 B2 | 7/2014 | Stebila et al. | |
| 9,071,598 B2* | 6/2015 | Ramzan | H04L 9/0844 |
| 2002/0144128 A1* | 10/2002 | Rahman | H04L 63/0838 |
| | | | 713/186 |
| 2003/0120929 A1* | 6/2003 | Hoffstein | H04L 9/3247 |
| | | | 713/176 |
| 2004/0125950 A1* | 7/2004 | Yen | H04L 9/003 |
| | | | 380/30 |
| 2007/0081667 A1* | 4/2007 | Hwang | H04L 9/3271 |
| | | | 380/30 |
| 2011/0302412 A1 | 12/2011 | Deng et al. | |
| 2014/0122888 A1* | 5/2014 | Yoon | H04L 9/0844 |
| | | | 713/171 |
| 2015/0215128 A1* | 7/2015 | Pal | H04L 9/3228 |
| | | | 713/155 |
| 2016/0248752 A1* | 8/2016 | Blinn | H04L 63/083 |
| 2016/0277400 A1* | 9/2016 | Maurya | H04L 63/0807 |

OTHER PUBLICATIONS

Ricciardi, Fulvio, "Kerberos Protocol Tutorial", National Institure of Nuclear Physics Computing and Network Services, Lecce, Italy, Nov. 27, 2007, 10 pages http://www.kerberos.org/software/tutorial.html.

Schwenk, Jorg "Modelling Time, or a Step Towards Reduction-based Security Proofs for OTP and Kerberos", Horst Gortz Institute, Ruhr-University Bochum, Germany, 2013 14 pages http://eprint.iacr.org/2013/604.pdf.

Schwenk, Jorg, "Modelling Time for Authenticated Key Exchange Protocols",Chapter 10 Horst Gortz Institute for IT-Security, Ruhr-University, Bochum, Germany, 2014 http://link.springer.com/chapter/10.1007/978-3-319-11212-1_16.

* cited by examiner

400

RECEIVE, OVER A PUBLIC NETWORK FROM A CLIENT DEVICE, BY AN AUTHENTICATION SERVER EXECUTING ON A PROCESSING DEVICE ASSOCIATED, AN AUTHENTICATION REQUEST COMPRISING A USER IDENTIFIER, WHEREIN THE USER IDENTIFIER IS ASSOCIATED WITH A PASSWORD 402

SELECT A FIRST PRIVATE KEY OF THE AUTHENTICATION SERVER FROM A FIRST RANGE AND A SECOND PRIVATE KEY OF THE AUTHENTICATION SERVER FROM A SECOND RANGE, WHEREIN AN UPPER LIMIT OF THE FIRST RANGE AND THE SECOND RANGE IS SPECIFIED ACCORDING TO A PRIME NUMBER 404

RECEIVE, FROM THE CLIENT DEVICE, A FIRST PUBLIC KEY OF THE CLIENT DEVICE AND A SECOND PUBLIC KEY OF THE CLIENT DEVICE 406

CALCULATE A THIRD PRIVATE KEY OF THE AUTHENTICATION SERVER IN VIEW OF THE SECOND PRIVATE KEY OF THE AUTHENTICATION SERVER AND A NUMERICAL VALUE OF THE PASSWORD 408

RECEIVE, FROM THE CLIENT DEVICE, A THIRD PUBLIC KEY OF THE CLIENT DEVICE 410

CALCULATE A SESSION KEY OF THE AUTHENTICATION SERVER IN VIEW OF THE SECOND AND THIRD PUBLIC KEYS OF THE CLIENT DEVICE AND THE THIRD PRIVATE KEY OF THE AUTHENTICATION SERVER 412

FIG. 4

KERBEROS PREAUTHENTICATION WITH J-PAKE

RELATED APPLICATIONS

The present application claims priority to U.S. Provisional Application No. 62/152,207 filed on Apr. 24, 2015, the content of which is incorporated by reference herein.

TECHNICAL FIELD

This disclosure relates to client device authentication using key exchange and, in particular, to authenticating the client device at a Kerberos key distribution center (KDC) using password authentication key exchange by juggling (J-PAKE).

BACKGROUND

An authentication server may run according to the Kerberos authentication protocol designed to provide reliable authentication over open and insecure networks in which the communication between a client device and the authentication server may be intercepted by an attacker. A user, through a client device, may request certain services from an application server. Prior to granting the request, the client device may need to make an authentication request to an authentication server operating according to the Kerberos authentication protocol. The authentication request may start a mutual authentication between the client device and the authentication server. According to the Kerberos authentication protocol, in response to the authentication request, the authentication server may transmit a pre-authentication request to the client to initiate a pre-authentication process. In response to receiving the pre-authentication request from the authentication server, the client device may resubmit the authentication request along with a timestamp encrypted with a user long term key. The timestamp reflects a time according to a clock of the client device. In response to receiving the resubmitted authentication request including the encrypted timestamp, the authentication server may decrypt the timestamp and compare the timestamp with a current time of the authentication server and determine whether the timestamp is in line with a clock of the authentication server. If the timestamp is in line with the clock of the authentication server, the authentication server may initiate the authentication process.

The pre-authentication using a timestamp, however, requires clock synchronization between the client device and the authentication server. In addition, a legitimate authentication request may fail if the clocks are not synchronized properly.

BRIEF DESCRIPTION OF THE DRAWINGS

The present disclosure is illustrated by way of example, and not by way of limitation, in the figures of the accompanying drawings.

FIG. 4 a flow diagram illustrating a method to authenticate a client device according to an implementation of the present disclosure.

DETAILED DESCRIPTION

Figure 1:
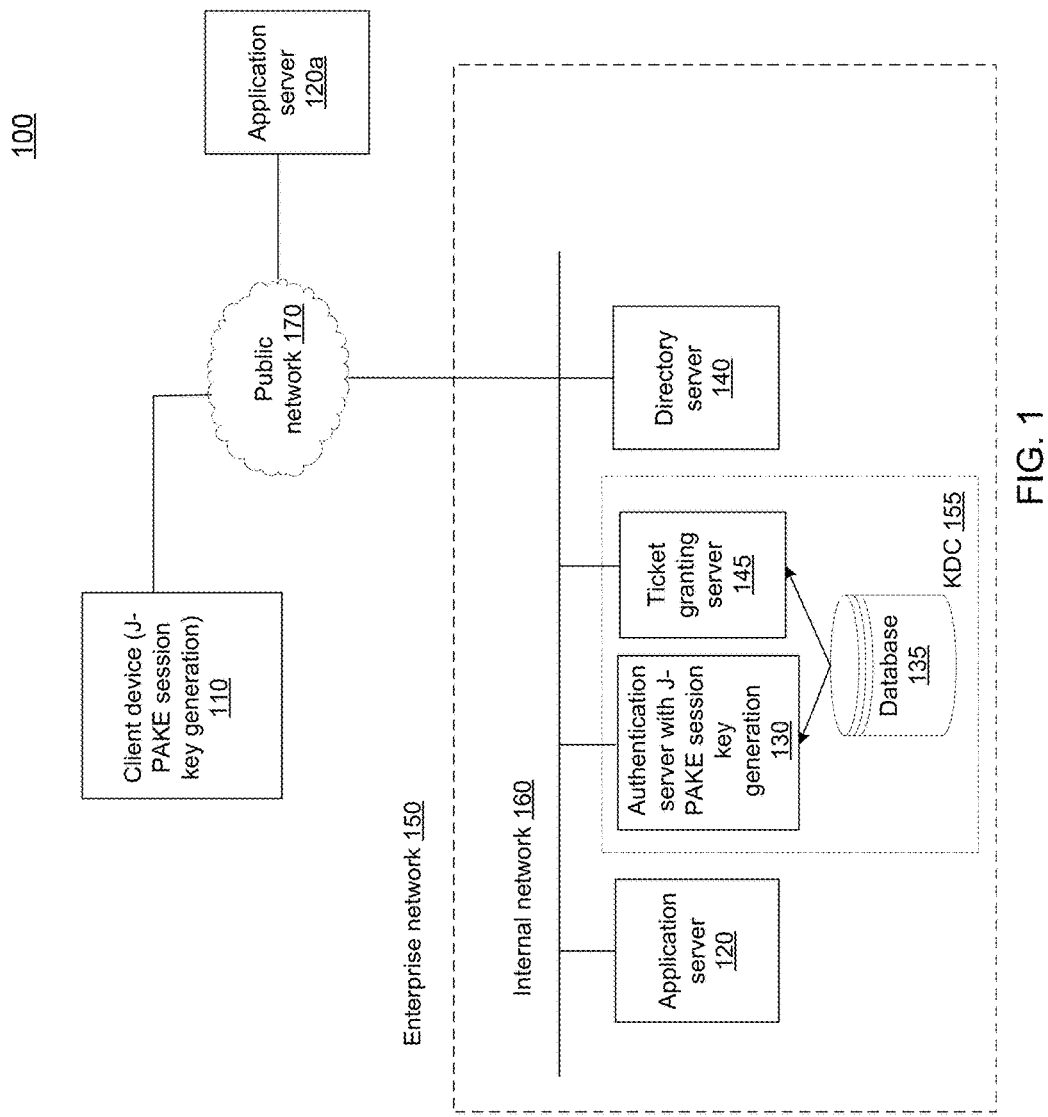
FIG. 1 illustrates a processing system to provide authentication service according to some implementations of the present disclosure.

Embodiments of the present disclosure use a type of password authenticated key exchange (PAKE) approach to substitute for the pre-authentication step in the Kerberos authentication protocol. PAKE approaches typically include an exchange of public keys over an open and insecure network. To prevent attacks from attackers, a large key size may be needed. However, a large key size means transmitting more data over the network, resulting in inefficiencies.

Embodiments of the present disclosure combine a password authenticated key exchange by juggling (J-PAKE) approach with elliptic curve cryptography (ECC) to generate a session key that may be used to encrypt data items transmitted from an authentication server operating according to the Kerberos authentication protocol. Compared to cryptographic approaches based on discrete logarithms, the ECC approach uses a set of operations on elliptic curves which results in greater securities, with a same key size. One problem with keys for ECC is that they are distinguishable from random numbers and, therefore, are vulnerable to dictionary attack. To address this issue, embodiments of the present disclosure use the J-PAKE approach to shield the keys for the ECC from offline dictionary attack. Thus, embodiments of the present disclosure provide efficient and secure pre-authentication, without the need for transmitting timestamps between the client device and the authentication server.

Implementations of the present disclosure relate to receiving, by an authentication server executed by a processing device, an authentication request from a client device via a public network, wherein the authentication request comprises a user identifier associated with a password, selecting a first private key of the authentication server from a first range of numbers and a second private key of the authentication server from a second range of numbers, wherein an upper limit of the first range and the second range is specified according to a prime number, receiving, from the client device, a first public key of the client device and a second public key of the client device, calculating a third private key of the authentication server in view of the second private key of the authentication server and a numerical value of the password, receiving, from the client device, a third public key of the client device, calculating a session key of the authentication server in view of the second public key of the client device, the third public key of the client device, and the third private key of the authentication server, and validating the session key.

Implementations of the present disclosure relate to a system including a memory and a processing device, operatively coupled to the memory, the processing device executing an authentication server to receive an authentication request from a client device via a public network, wherein the authentication request comprises a user identifier associated with a password, select a first private key of the authentication server from a first range of numbers and a second private key of the authentication server from a second range of numbers, wherein an upper limit of the first range and the second range is specified according to a prime number, receive, from the client device, a first public key of the client device and a second public key of the client device, calculate a third private key of the authentication server in view of the second private key of the authentication server and a numerical value of the password, receive, from the client device, a third public key of the client device, calculate a session key of the authentication server in view of the second public key of the client device, the third public key of the client device, and the third private key of the authentication server, and validate the session key.

FIG. 1 illustrates a processing system 100 providing authentication service according to some implementations of the present disclosure. The processing system 100 may include one or more computer systems connected via one or more networks. As used herein, a "computer system" refers to a system including one or more processors, one or more memory devices, and one or more communication interfaces.

As used herein, a "processor" refers to a device capable of executing instructions encoding arithmetic, logical, or I/O operations. In one implementation, the processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A "memory device" herein shall refer to a volatile or non-volatile memory device, such as RAM, ROM, EEPROM, or any other device capable of storing data. A "communication interface" herein shall refer to circuitry or device communicatively coupled to one or more processors and capable of routing data between the processors and one or more external devices.

Referring to FIG. 1, the processing system 100 may include a client device 110 that is operatively connected to an enterprise network 150 via a public network 170 which is open and insecure. An attacker may also monitor the traffic (e.g., data packets) transmitted between the client device 110 and the enterprise network 150 over the public network 170. The client device 110 may be a computing device such as a computer, a tablet, or a smart phone on which a user of the client device may have established an account. The user may log into the account by providing certain credentials (such as a matching pair of a user identifier and a password) associated with the user identifier. The client device 110 may further attempt to establish a secured communication channel with the enterprise network 150 via the public network 170 according to certain protocols.

The enterprise network 150 may include physical servers and/or virtual machines, raw and file-based storage, routers, firewalls, and/or load balancers interconnected by two or more LANs. As shown in FIG. 1, enterprise network 150 may include an internal network 160. In other implementations, enterprise network 150 may include various other network topologies, including two or more internal networks and/or one or more de-military zone (DMZ) networks.

Enterprise network 150 may further include an application server 120, a key distribution center (KDC) 155, and a directory server 140 interconnected via internal network 160. The application server 120 is a server program implemented on a hardware system (e.g., a computer system) to provide certain services to client device 110. The services provided by the application server 120 may include, for example, Internet Message Access Protocol (IMAP) service, Post Office Protocol (POP) service, and Simple Mail Transfer Protocol (SMTP) service. The application server 120 provides services if client devices can provide authentication proof. In one implementation, the client device 110 may obtain tickets including proof of authentications from the KDC 155. A ticket is a data object exchanged between client device 120 and different servers (e.g., application server 120 and authentication server 130), containing information pertaining to the user, services, and hosts to provide the services.

In one implementation, KDC 155 includes an authentication server 130, a ticket granting server (TGS) 145, and a database 135. The authentication server 130 is a server program running on a dedicated hardware server (e.g., a computer system) for receiving, processing, and responding to the initial authentication request submitted by a user from the client device 110. The database 135 is a storage device that may store entries relating to users, services authorized to these users, or hosts to provide these services. The name of each entry is referred as a principal. Thus, principals can be associated with a user, a host, or a service. The TGS 145 is a server program that distributes service tickets to client devices. For example, after the authentication of an entity based on principals stored in the database 135, the TGS 145 may issue a ticket granting ticket (TGT) (also known as proof of authentication token) to the client device 110, wherein the TGT may include data items authenticating a user to receive certain services from the application server 120 hosted on a host machine. In one implementation, the authentication server 130 and the TGS 145 may be implemented on a single dedicated hardware platform. In another implementation, the authentication server 130 and the TGS 145 are implemented on separate hardware platforms. In one implementation, the KDC 155 may provide authentication service for multiple application servers as long as they are within a realm supported by the authentication server 130. For example, an application server 120a may be connected to the KDC 155 via the public network 170.

Directory server 140 is designed to provide distributed directory information services by storing an organized set of records representing various entities, including users, user groups, organizations, etc. In some implementations, directory server 140 may implement Lightweight Directory Access Protocol (LDAP).

A user of the client device 110 is identified by a user identifier. The user may, via the client device 110, initiate an authentication request (AS_REQ) to the authentication server 130 to request certain services from application server 120. In one implementation, the client device 110 may receive the user identifier and the password associated with the user identifier, and the client device 110 may send the authentication request including the user identifier (but not the password) to the authentication server 130. The authentication server 130 may already have access to the password associated with the user identifier. For example, the password may be stored in an encrypted form in the database 135, and linked to the principal associated with the user. In one embodiment, upon receiving the authentication request, the authentication server 130 may calculate a session key (K) based on the password known to the authentication server 130 being associated with the user identifier and certain parameters shared between the client device 110 and the authentication server 130. The parameters may be associated with a math problem to be solved by the authentication server 130 and the client device 110 to derive the session key. A session key (K) is a key generated at KDC 155 for a work session opened in response to receiving the authentication request from the client device 110. Thus, the session key (K) is valid for the duration of the session and is used to encrypt data items stored in subsequent tickets issued by the KDC 155.

Figure 2:
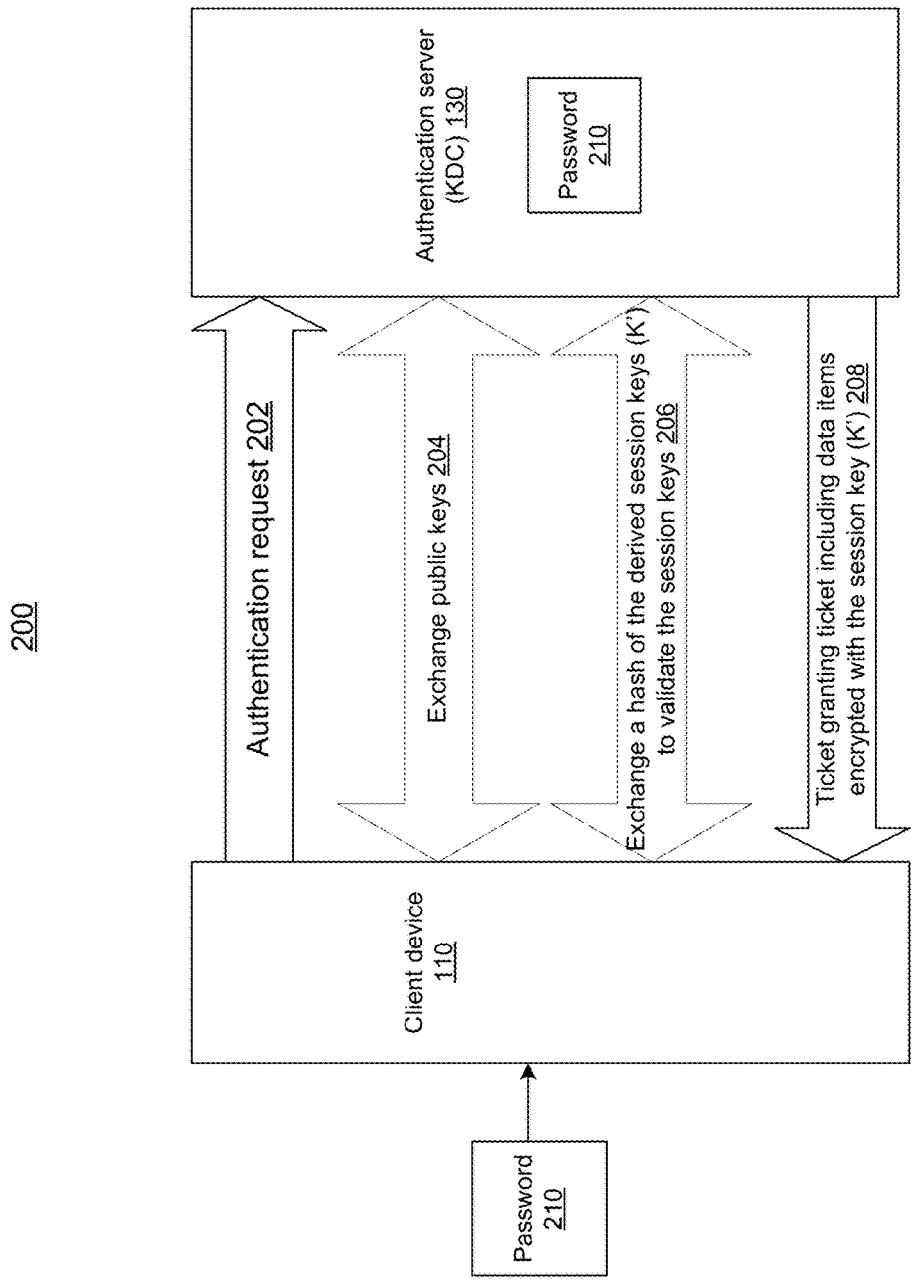
FIG. 2 illustrates a process to authenticate a client device by an authentication server according to an implementation of the present disclosure.
Figure 3:
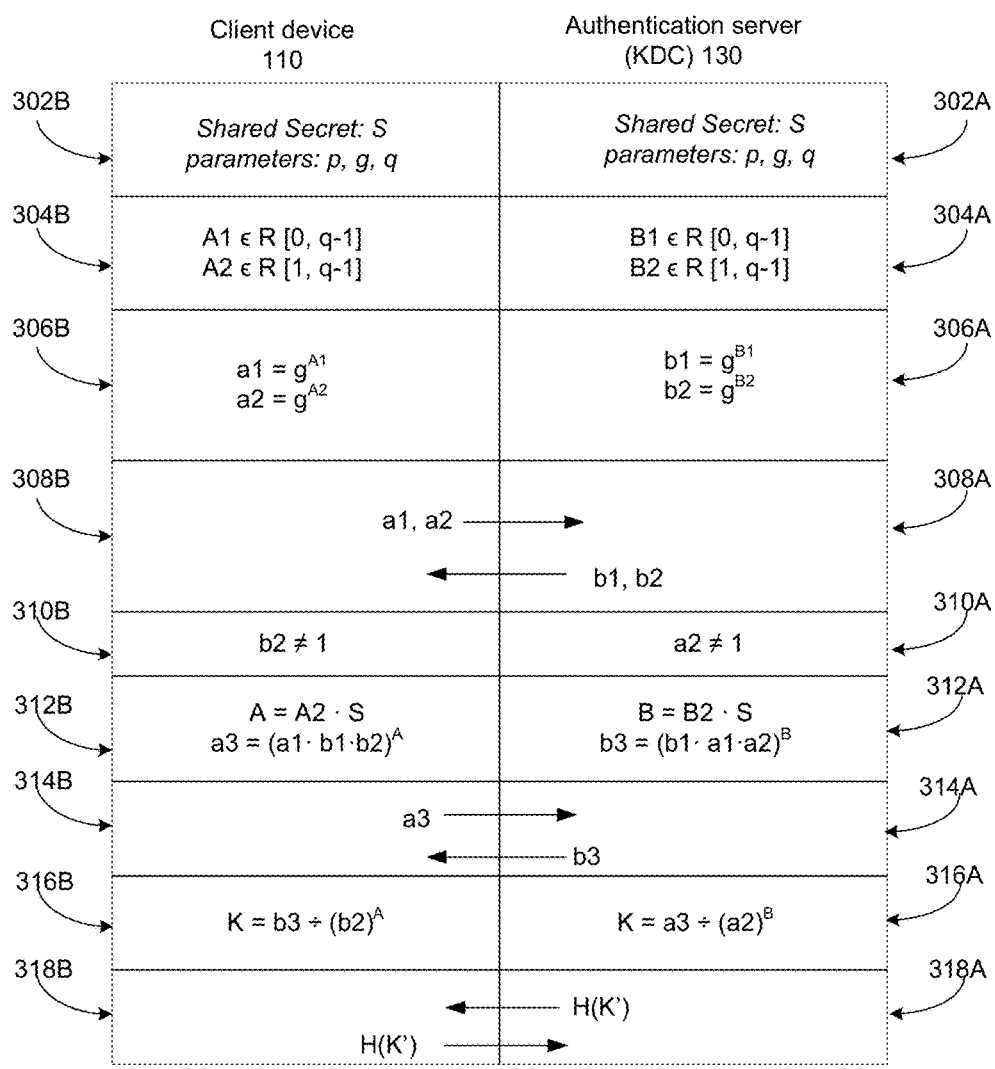
FIG. 3 illustrates a J-PAKE method to establish a trusted session key between the client device and the authentication server according to an implementation of the present disclosure.

In one embodiment, both the client device 110 and the authentication server 130 may each independently calculate a respective copy of the session key (K) based on the password and the shared knowledge using the J-PAKE approach with ECC as described in subsequent sections in conjunction with FIGS. 2 and 3. The client device 110 and the authentication server 130 may calculate a derived session key (K') by applying a key derivation function to the session key and then exchange a hashed version of the derived session key (K') to validate the session key (K). In response to successfully validating the hashed version of the derived session key (K') received from the client device 110, the authentication server may instruct the TGS 145 to issue the TGT to the client device. However, in response to failing to validate the hashed version of the derived session key (K') received from the client device 110, the authentication server may deny the authentication request from the client device 110 either by transmitting a denial of authentication token to the client device or ignoring the authentication request.

FIG. 2 illustrates a process to authenticate client device 110 by an authentication server 130, according to an implementation of the present disclosure. As shown in FIG. 2, the client device 110 may receive, from a user (or an entity), a user identifier associated with the user and a password 210 in order to request certain services from an application server. In response to receiving the user identifier and the service request, at 202, the client device 110 may transmit an authentication request to the authentication server 130. In one implementation, the authentication request includes the user identifier and an identifier associated with one or more requested services.

In response to receiving the authentication request, the authentication server 130 retrieves data related to the user identifier from an authentication database (e.g., database 135). The authentication server 130 may retrieve the secret (e.g., the password 210) shared with the client device according to the received user identifier. In one implementation, the client device 110 and the authentication server 130 may execute a respect J-PAKE program to calculate a respective copy of a session key (K). To carry out the matching J-PAKE programs, the client device 110 and the authentication server 130 may share certain parameters that define the type of J-PAKE approach encoded in the J-PAKE program. In one implementation, the shared parameters include a prime number (p), a group order parameter (q) which is also a prime number, and a generator (or a generating set) (g). The prime number (p) defines a number group (e.g., a number range such as, for example, [0, 7]) that is used for the cryptography. In one embodiment, the prime number p may be a safe prime number (i.e., a prime number of the form of 2p'+1, wherein p' is also a prime). In another implementation, the prime number (p) defines a prime-order subgroup (or, a subgroup whose order is also a prime number). The parameter (q) specifies the order of the group specified by the prime number (p). The generator (g) (or generating set) refers to a number (or a small set) that, when applied by a set of operations, may generate a large set of numbers. The processing devices associated with the client device 110 and KDC 155 may then execute the J-PAKE program specified by these parameters to calculate a respective copy of the session key (K).

In one implementation, in order to arrive at the session key, at 204, the client device 110 and the authentication server 130 may exchange certain public keys calculated at the client device 110 and the authentication server 130 to facilitate the counterparty's calculation. These public keys are intermediate results transmitted over the open and insecure public network 170 that is subject to attacks. In one implementation, the J-PAKE approach may include two rounds of public key exchanges at two different points of the J-PAKE approach to increase the security against attacks (i.e., the attackers need to attack multiple public keys correctly). With the public keys received from the counterparty, the client device 110 and the authentication server 130 may calculate their respective copy of the session key (K).

In one implementation, at 206, the client device 110 and the authentication server 130 may each calculate a respective derived session key (K') from their copies of the session key (K) using a key derivation function (KDF). Further, the client device 110 and the authentication server 130 may calculate a hash value H(K') for their derived session keys (K'). At 206, the client device 110 and the authentication server 130 may exchange the hash value H(K') to determine whether their respective copy of the session key (K) is valid. In the event that the authentication server is able to validate its session key through the hash value H(K') received from the client device, at 208, the authentication server 130 may send the TGT including the data items encrypted by the session key (K) to the client device. In one implementation, the data items in the TGT may enable the client device 110 to obtain the requested services from the application server.

The J-PAKE approach may be implemented in various manners. FIG. 3 illustrates a J-PAKE method 300 to establish a trusted session key (K) between the client device 110 and the authentication server 130 according to an implementation of the present disclosure. As shown in FIG. 3, the right column depicts steps 302A-318A that a processing device of the authentication server 130 performs. The left column of FIG. 3 depicts steps 302B-318B that a processing device of the client device 110 performs. Each side performs corresponding steps and exchange certain public key data at 308A, 308B and 314A, 314B to arrive at a respective copy of the session key (K) at 316A and validate the session key (K) at 318A, 318B.

In one implementation, the authentication server 130 and the client device 110 already share certain information and data about the user using the client device 110 and parameters specifying the J-PAKE. Therefore, at 302A, 302B, the authentication server 130 and the client device 110 may retrieve the shared data and information. The shared data and information may have been acquired by the client device 110 and the authentication server 130 through channels other than the public network 170. In one implementation, the client device 110 and the authentication server 130 may share a secret (e.g., a password) of the user. The processing devices associated with the client device 110 and the authentication server 130 may execute a string2num( ) program to convert the secret into a numerical secret value (S). Further, the client device 110 and the authentication server 130 may also independently obtain the shared parameters (p, q, g), as described above, specifying the J-PAKE approach.

At 304A, 304B, processing devices associated with the client device 110 and the authentication server 130 may each calculate a respective pair of random numbers (A1, A2) for the client device, and (B1, B2) for the authentication server 130, wherein A1 and B1 are random numbers selected from the range [0, q−1] and A2 and B2 are random numbers selected from the range [1, q−1], wherein q is the order of a prime order subgroup specified by the prime p. Random numbers (A1, A2) can serve as the first and second private keys for the client device 110, and random numbers (B1, B2) can serve as the first and second private keys for the authentication server 130.

At 306A, 306B, processing devices associated with the client device 110 and the authentication server 130 may each calculate a respective pair of public keys (a1, a2) for the client device 110, and (b1, b2) for the authentication server 130, wherein the public keys may be derived using the following exemplary formulae: $a1=g^{A1}$, $a2=g^{A2}$, $b1=g^{B1}$, $b2=g^{B2}$, and wherein g is a generator number.

At 308A, 308B, the client device 110 and authentication server 130 may exchange their respective first and second public keys (a1, a2), (b1, b2) over the public network. In one implementation, at 308B, the client device 110 may transmit public keys (a1, a2) as the data payload of packets to the authentication server 130, and similarly, the authentication server 130 may transmit public keys (b1, b2) to the client device 110.

At 310A, the processing device associated with the authentication server may determine whether a2 has a value of one, and similarly, at 310B, the processing device associated with the client device may determine whether b2 has a value of one.

In response to determining that the value of b2 is not one, the processing device associated with the client device 110 may calculate a third private key (A) as a product of the second private key (A2) and the secret value (S) (or A=A2·S), and similarly, the processing device associated with the authentication server 130 may calculate a third private key (B) as a product of the second private key (B2) and the secret value (S) (or B=B2·S). Further, the processing device associated with the client device 110 may calculate a third public key (a3) of the client device 110 using the following exemplary formula: $a3=(a1 \cdot b1 \cdot b2)^A$, wherein the third private key (A) is the exponent of the product of first public key (a1) of the client device, the first public key (b1) of the authentication server 130, and second public key (b2) of the authentication server. The processing device associated with the authentication server 130 may calculate a third public key (b3) of the authentication server 130 using the following exemplary formula: $b3=(b1 \cdot a1 \cdot a2)^B$, wherein the third private key (B) is the exponent of the product of first public key (b1) of the authentication server, the first public key (a1) of the client device 110, and the second public key (a2) of the client device.

At 314A, 314B, the client device 110 and authentication server 130 may exchange their respective third public keys (a3, b3) over the public network. In one implementation, at 308B, the client device 110 may transmit its third public key (a3) as the data payload of packets to the authentication server 130, and similarly, the authentication server 130 may transmit its third public key (b3) to the client device 110.

In response to receiving the third public key from their respective counterparty, at 316A, the processing device associated with the authentication server 130 may calculate its copy of the session key (K) using the second and third public keys (a2, a3) received from the client device 110 using the following exemplary formula: $K=a3 \div (a2)^B$. The processing device associated with the client device 110 may calculate its copy of the session key (K) using the second and third public keys (b2, b3) received from the authentication server 130 using the following exemplary formula: $K=b3 \div (b2)^A$. In one implementation, the authentication server 130 may use the calculated session key (K) to encrypt data items stored in tickets (e.g., TGT).

At 318A, 318B, the authentication process may further include validating the session key (K) by both the client device 110 and the authentication server 130. The validation may be carried out according to any suitable validation approaches. In one implementation, at 318A, the authentication server 130 may initiate the validation by calculating a derived session key (K') from its copy of the session key (K) using a key derivation function (KDF). The key derivation function may be any suitable type of KDF including, for example, key stretching and key strengthening schemes. The processing device associated with the authentication server 130 may then compute a hash value of the derived session key (K') using a suitable hash function that is known to both the authentication server 130 and the client device 110. The authentication server 130 may then transmit the hash value H(K') of the derived session key (K') to the client device 110. Because the client device 110 can also generate the derived session key (K') based on its own copy of the session key (K), client device 110 may validate the H(K') received from the authentication server 130 with the hash value of its own copy of the session key (K). Similarly, at 318B, the processing device associated with the client device 110 may calculate a derived session key (K') using the KDF based on the session key (K) and calculate a hash value H(K') for the derived session key (K'). The client device 110 may then transmit the hash value H(K') to the authentication server 130 that may validate the H(K') received from the client device 110 with the hash value of its own copy of the session key (K).

In one implementation, in response to successfully validating the hash value H(K') received from the client device 110, the authentication server 130 may cause to transmit a TGT to the client device. In one implementation, the TGT may include data items, encrypted using the session key (K), what provide tickets for the client device 110 to receive the requested service from the application server 120. But, if the authentication server 130 fails to validate the session key (K), the authentication server 130 may issue a denial of authentication token to the client device 110 to deny the client device's request for service.

FIG. 4 is a flow diagram illustrating a method 400 to authenticate a client device according to some implementations of the present disclosure. The method 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, the methods may be performed by the processing device of authentication server 130 or the processing device of client device 110 as shown in FIGS. 1 and 2.

Referring to FIG. 4, at 402, the processing logic may receive an authentication request from a client device over the unsecured public network. The authentication request may include a request to access an application server for receiving certain services (e.g., a web service) at the application server. The request may include a user identifier to identify a user associated with the client device. The processing logic may be part of an authentication server (e.g., the authentication server associated with a Kerberos key distribution center) authenticating users on behalf of one or more application servers. The processing logic may identify and retrieve, from storage devices, a user password data associated with the user identifier, wherein the user password may have been previously transmitted to the storage device by an independent communication channel. The processing logic may convert the password into a numerical value (S).

At 404, the processing logic may randomly select a first private key (B1) (or first random number) of the authentication server from a range of [0, q−1] and randomly select a second private key (B2) (or second random number) of the authentication server from a range of [1, q−1], wherein q is a prime number that depicting an order of a prime order subgroup.

At 406, the processing logic may receive a first public key (a1) of the client device and a second public key (a2) of the client device, wherein the client device calculates its first and second public keys from private keys of the client device.

At 408, the processing logic may calculate a third private key (B) of the authentication server based on the second private key (B2) of the authentication server and the numerical value (S) of the user password. In one implementation, the third private key (B) is the multiplication of the second private key (B2) and the numerical value (S) of the user password.

At 410, the processing logic may receive a third public key (a3) of the client device, wherein the third public key (a3) of the client device may be calculated by the client device using certain public keys of the authentication server transmitted to the client device.

At 412, the processing logic may calculate a session key (K) for the authentication server based on the received second and third public keys (a2, a3) of the client device and the third private key (B) of the authentication server. In one implementation, the session key (K) may be calculated according to $K=a3 \div (a2)^B$.

In one implementation, the processing logic may further validate the session key. To validate the session key, the processing logic of the authentication server may receive a hash value from the client device. The received hash value is purported to be the hash value of a derived session key symmetrically generated and derived at the client device. The processing logic may compute a derived session key and its hash value based on its own copy of the session key, and then the processing logic may compare the computed hash value with the received hash value to determine whether the session key is valid. In response to determining that the session key is valid, the processing logic may issue a ticket granting ticket to the client device to enable the client device receive services from the application server. In response to determining that the session key is invalid, the processing logic may issue a denial-of-authentication token to the client device.

Figure 5:
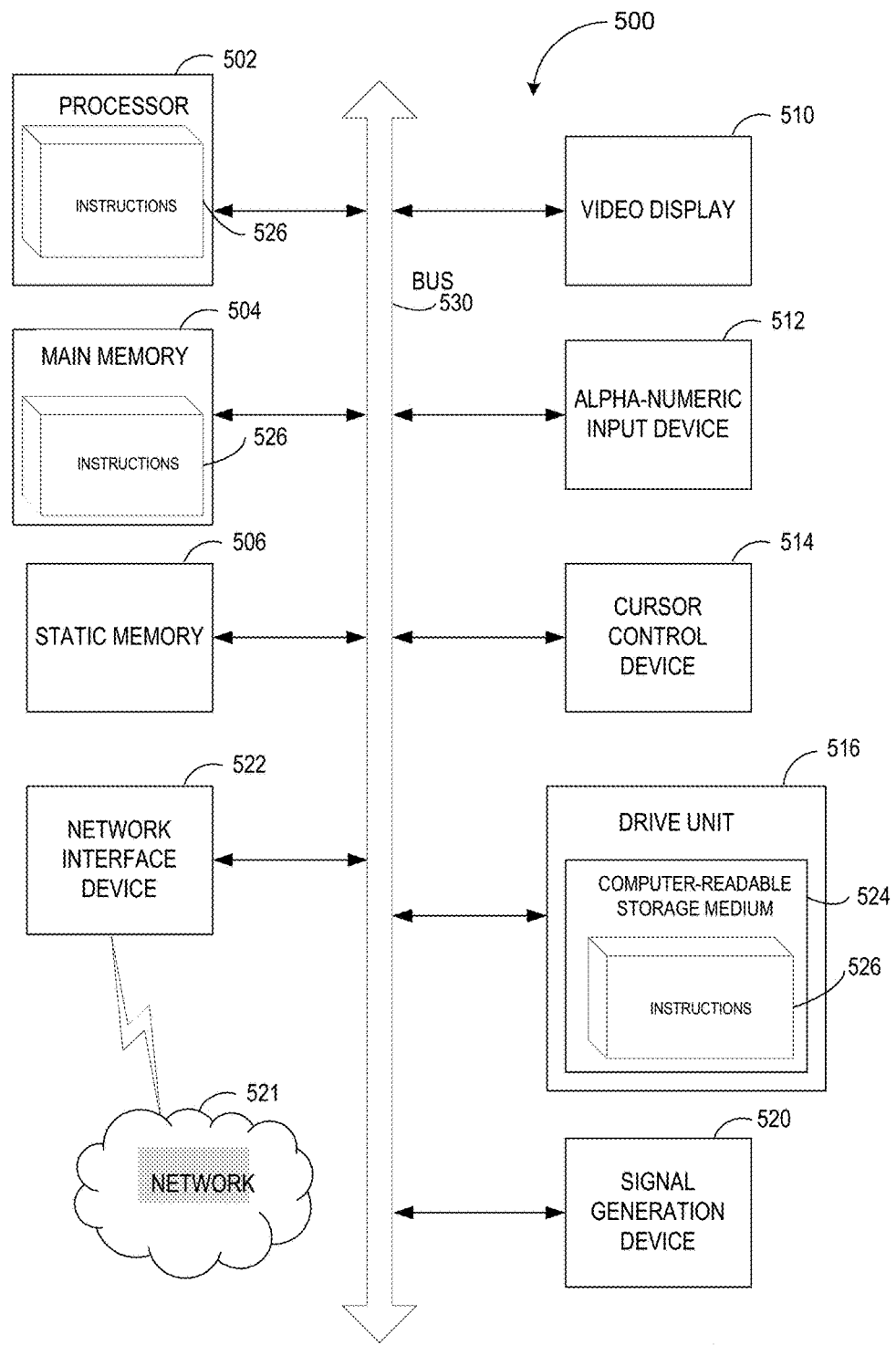
FIG. 5 is a block diagram illustrating an exemplary computer system according to an implementation of the present disclosure.

FIG. 5 illustrates a diagrammatic representation of a machine in the exemplary form of a computer system 500 within which a set of instructions for causing the machine to perform any one or more of the methodologies discussed herein may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD), a cathode ray tube (CRT), or a touch screen), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein (e.g., authentication server 130). The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 574 via the network interface device 522.

While the computer-readable storage medium 524 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "enabling", "identifying," "selecting," "displaying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by an authentication server executed by a processing device, an authentication request from a client device via a public network, wherein the authentication request comprises a user identifier associated with a password;
   selecting a first private key of the authentication server from a first range of numbers and a second private key of the authentication server from a second range of numbers, wherein an upper limit of the first range and the second range is specified according to a prime number;
   receiving, from the client device, a first public key of the client device and a second public key of the client device;
   calculating a third private key of the authentication server by multiplying the second private key of the authentication server with a numerical value of the password;
   receiving, from the client device, a third public key of the client device;
   calculating a session key of the authentication server in view of the second public key of the client device, the third public key of the client device, and the third private key of the authentication server;
   validating the session key in view of a first hash value received from the client device; and
   in response to failing to validate the session key in view of the first hash value, issuing a denial-of-authentication token to the client device.

2. The method of claim 1, wherein validating the session key comprises:
   receiving the first hash value from the client device;
   calculating a derived session key using a key derivation function in view of the session key of the authentication server;
   calculating a second hash value of the derived session key; and validating the second hash value of the derived key in view of the first hash value received from the client device.

3. The method of claim 2, further comprising:
in response to successfully validating the second hash value with the first hash value, issuing a ticket granting ticket to the client device, wherein at least one data item in the ticket granting ticket is encrypted with the session key of the authentication server.

4. The method of claim 2, wherein validating the session key comprises validating the second hash value.

5. The method of claim 1, wherein the authentication server is part of a Kerberos key distribution center, and wherein the authentication server does not perform pre-authentication using a timestamp received from the client device.

6. The method of claim 1, wherein the first private key is a first number randomly selected from the first range, the second private key is a second number randomly selected from the second range, and the prime number is an order of a prime order subgroup.

7. The method of claim 1, wherein the client device comprises a processing device to:
select a first private key of the client device from the first range and a second private key of the client device from the second range;
calculate the first public key of the client device by applying the first private key of the client device to a generator value and the second public key of the client device by applying the second private key of the client device to the generator value; and
transmit the first public key of the client device and the second public key of the client device to the authentication server.

8. The method of claim 1, further comprising:
in response to receiving the second public key of the client device, determining that a value of the second public key of the client device; and
in response to determining that the second public key of the client device is not equal to one, calculating the third private key of the authentication server in view of the second private key of the authentication server and the numerical value of the password.

9. The method of claim 1, wherein calculating the session key of the authentication server comprises dividing the third public key of the client device by the second public key of the client device to a power of the third private key of the authentication server, and wherein the third public key of the client device is calculated in view of the first public key of the client device.

10. A non-transitory machine-readable storage medium storing instructions which, when executed, cause a processing device to:
receive, by an authentication server executed by the processing device, an authentication request from a client device via a public network, wherein the authentication request comprises a user identifier associated with a password;
select a first private key of the authentication server from a first range of numbers and a second private key of the authentication server from a second range of numbers, wherein an upper limit of the first range and the second range is specified according to a prime number;
receive, from the client device, a first public key of the client device and a second public key of the client device;

calculate a third private key of the authentication server in view of the second private key of the authentication server and a numerical value of the password;
receive, from the client device, a third public key of the client device;
calculate a session key of the authentication server by dividing the third public key of the client device by the second public key of the client device to a power of the third private key of the authentication server, and wherein the third public key of the client device is calculated in view of the first public key of the client device;
validate the session key in view of a first hash value received from the client device; and
in response to failing to validate the session key in view of the first hash value, issue a denial-of-authentication token to the client device.

11. The non-transitory machine-readable storage medium of claim 10, wherein to validate the session key, the processing device is further to:
receive the first hash value from the client device;
calculate a derived session key using a key derivation function in view of the session key of the authentication server;
calculate a second hash value of the derived session key; and
validate the second hash value of the derived key in view of the first hash value received from the client device.

12. The non-transitory machine-readable storage medium of claim 11, wherein the processing device is further to:
in response to successfully validating the second hash value with the first hash value, issue a ticket granting ticket to the client device, wherein at least one data item in the ticket granting ticket is encrypted with the session key of the authentication server.

13. The non-transitory machine-readable storage medium of claim 10, wherein the first private key is a first number randomly selected from the first range, the second private key is a second number randomly selected from the second range, and the prime number is an order of a prime order subgroup.

14. The non-transitory machine-readable storage medium of claim 10, wherein to calculate the third private key of the authentication server, the processing device multiplies the second private key of the authentication server with the numerical value of the password.

15. A system, comprising:
a memory; and
a processing device, operatively coupled to the memory, the processing device executing an authentication server to:
receive an authentication request from a client device via a public network, wherein the authentication request comprises a user identifier associated with a password;
select a first private key of the authentication server from a first range of numbers and a second private key of the authentication server from a second range of numbers, wherein an upper limit of the first range and the second range is specified according to a prime number;
receive, from the client device, a first public key of the client device and a second public key of the client device;
calculate a third private key of the authentication server by multiplying the second private key of the authentication server with a numerical value of the password;
receive, from the client device, a third public key of the client device;

calculate a session key of the authentication server in view of the second public key of the client device, the third public key of the client device, and the third private key of the authentication server;

validate the session key in view of a first hash value received from the client device; and in response to failing to validate the session key in view of the first hash value, issue a denial-of-authentication token to the client device.

16. The system of claim 15, wherein to validate the session key, the processing device is further to:

receive a first hash value from the client device, calculate a derived session key using a key derivation function in view of the session key of the authentication server, calculate a second hash value of the derived session key, and validate the second hash value of the derived key in view of the first hash value received from the client device.

17. The system of claim 16, wherein the processing device is further to:

in response to successfully validating the second hash value with the first hash value, issue a ticket granting ticket to the client device, wherein at least one data item in the ticket granting ticket is encrypted with the session key of the authentication server.

18. The system of claim 15, wherein the first private key is a first number randomly selected from the first range, the second private key is a second number randomly selected from the second range, and the prime number is an order of a prime order subgroup.

* * * * *